United States Patent [19]

Militano

[11] 4,063,836
[45] Dec. 20, 1977

[54] FURNITURE CONNECTING MEANS

[75] Inventor: Vincent Militano, Massapequa, N.Y.

[73] Assignee: Finkel Outdoor Products, Inc., Garfield, N.J.

[21] Appl. No.: 773,518

[22] Filed: Mar. 2, 1977

[51] Int. Cl.² .............................................. F16B 7/00
[52] U.S. Cl. .................................. 403/263; 403/322; 256/65; 182/228
[58] Field of Search .............. 403/263, 230, 242, 244, 403/252, 254, 322, 349, 329, 194, 255, 247, 240, 264, 197, 196, 253; 182/228; 256/65

[56] References Cited

U.S. PATENT DOCUMENTS

| 998,582 | 7/1911 | Lucas | 403/252 X |
|---|---|---|---|
| 2,501,940 | 3/1950 | Hibbard | 403/329 X |
| 2,660,457 | 11/1953 | Malloy | 403/349 |
| 3,068,029 | 12/1962 | Schwartz | 403/242 |
| 3,653,697 | 4/1972 | Ernst | 403/243 |

FOREIGN PATENT DOCUMENTS

| 178,114 | 2/1962 | Sweden | 256/65 |
|---|---|---|---|
| 870,536 | 6/1961 | United Kingdom | 182/228 |

Primary Examiner—Andrew V. Kundrat
Attorney, Agent, or Firm—William R. Liberman

[57] ABSTRACT

A hollow tube constitutes a structural member having an opening in a wall thereof which surrounds a short hollow sleeve closely fitting within the tubular member, the sleeve having diametrically opposed openings one of which is of the size and shape of the opening in the tube wall. The margin of one of the openings in the sleeve is shouldered inwardly. The sleeve is so positioned within the tube that the openings are aligned, the shouldered opening of the sleeve being diametrically opposed to the aligned openings in the tube and sleeve. A hollow tubular bracing cross-member is provided of such dimension as to pass through, with minimum clearance, the aligned openings in the tube and sleeve, the free end of the cross member being received within the diametrically-located opening in the sleeve and resting upon the shoulder thereof. Means are provided to lock the bracing cross member removably within and to the tube and sleeve.

8 Claims, 9 Drawing Figures

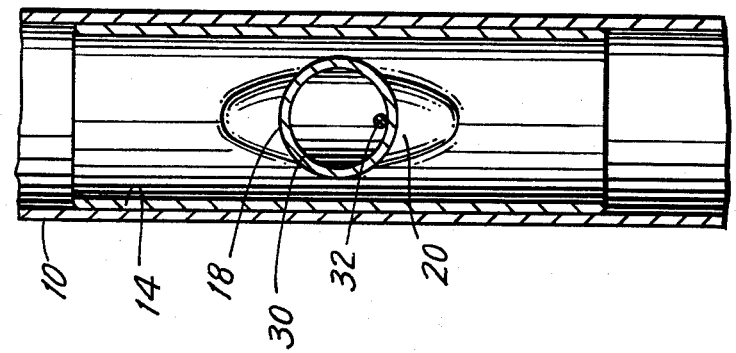
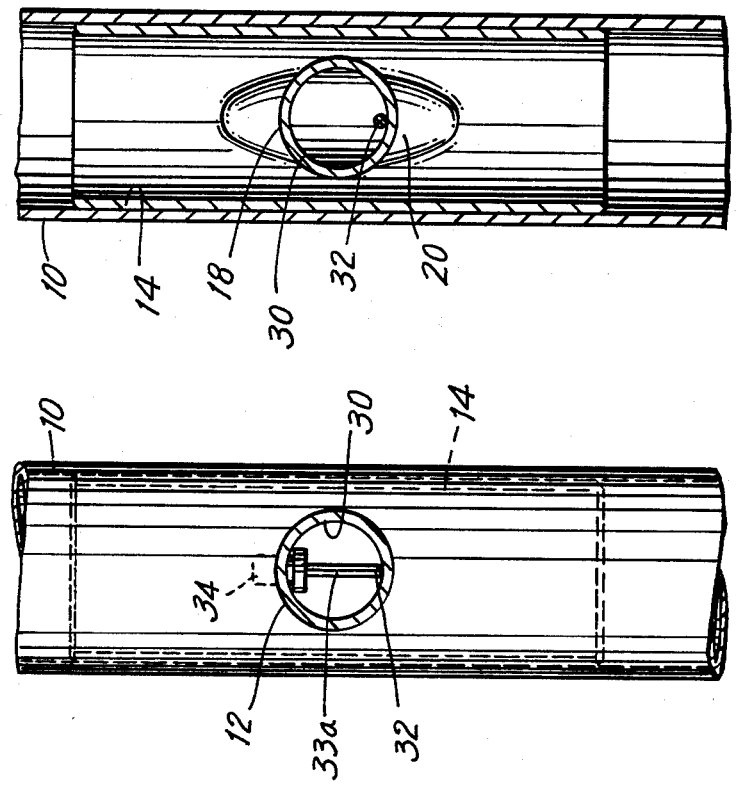
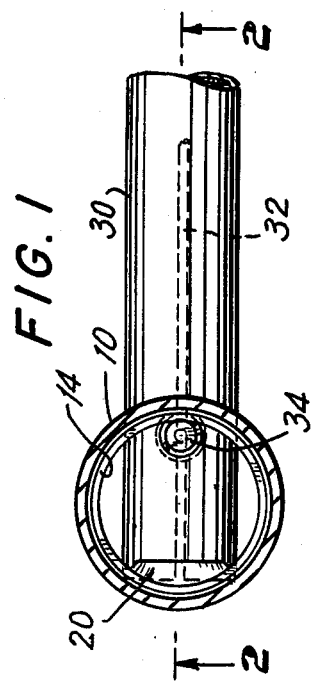
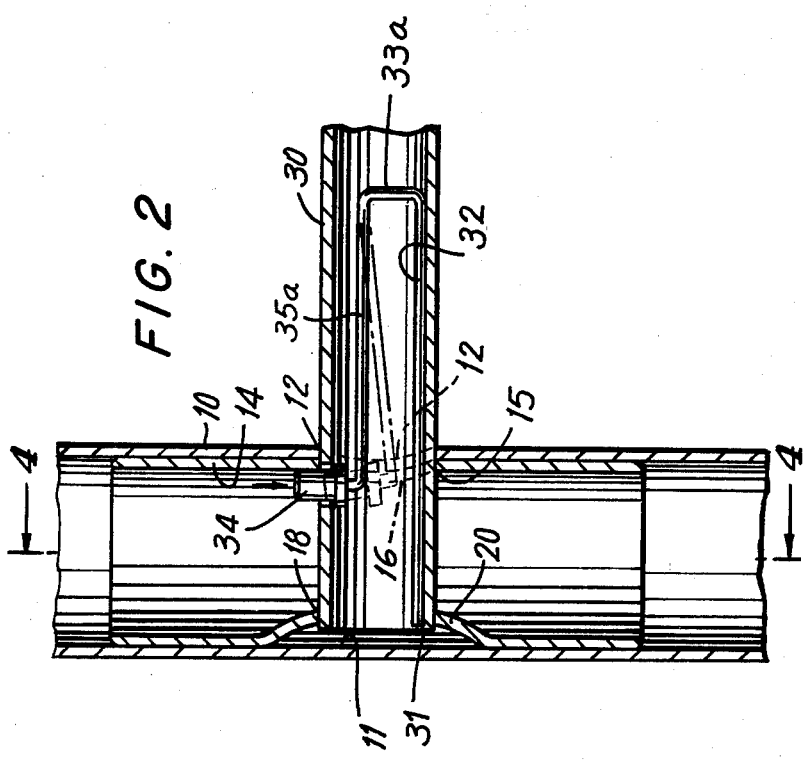

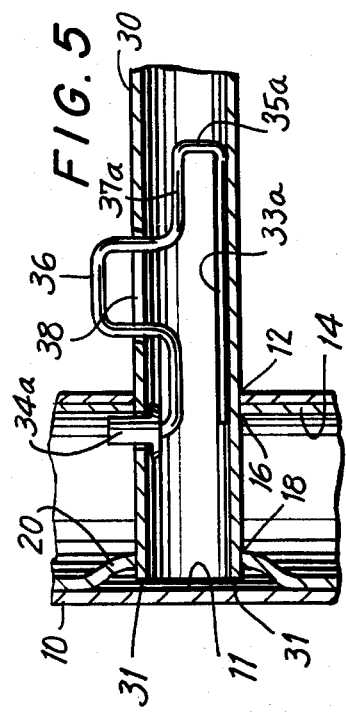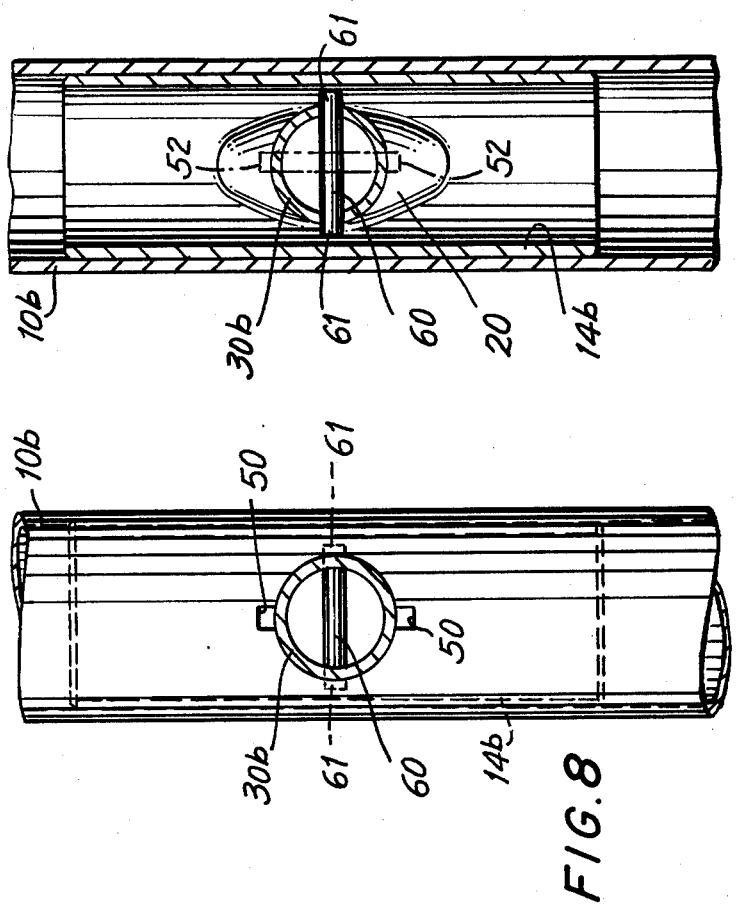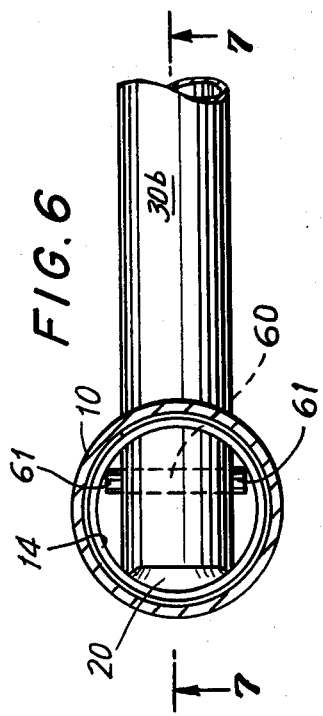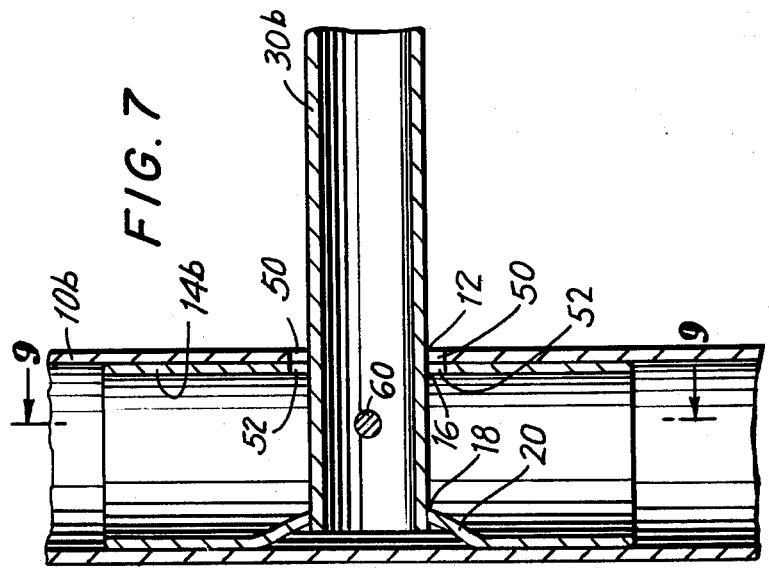

FURNITURE CONNECTING MEANS

The device of the present invention relates generally to articles of furniture made increasingly in recent years of hollow tubular metal construction, aluminum and the like being well-known metals for such uses. The problem has always existed of securing such tubular members together so as to prevent relative angular and axial play therebetween, leading to the early destruction or the inoperability of the so constructed hollow tubular articles of furniture in the past. Various expedients as riveting, brazing, or welding have been employed, but these involve considerable expense in construction, and, in addition, they distract from the appearance of the article. It is, therefore, an object of the present invention to provide a novel joint, and a novel method and means of joining hollow tubular cross members in articles of furniture or otherwise in such fashion as to reduce any play therebetween while permitting ready disassembly thereof. A further object of the present invention is to lock cross members in furniture by inserting a closely fitting sleeve within one of the tubular members, providing registering openings in the sleeve and tube, the sleeve also being provided with a second opening diametrically opposed to the first opening, and a cross bracing member extending through all three openings thereby providing a double bearing or support for the end of the cross bar inserted within the tube, making for rigidity of the connection.

In the drawings annexed hereto, forming a part hereof,

FIG. 1 is a part horizontal section, part top plan, of a portion of a structural arrangement illustrating one embodiment of the present invention;

FIG. 2 is a longitudinal section on the line 2—2 of FIG. 1;

FIG. 3 is a plan view of the structural arrangement of FIG. 1, the cross bracing component being shown in section;

FIG. 4 is a longitudinal section on the line 4—4 of FIG. 2;

FIG. 5 is a view similar to FIG. 2 of another embodiment of interlock constructed according to and embodying the present invention;

FIGS. 6, 7, 8 and 9 are views similar to FIGS. 1 to 4 of another embodiment of the present invention.

The present invention may be applied to such article of furniture as a chair or chaise, wherein reference numeral 10 indicated a ground or other support-engaging, hollow, tubular leg member. In the embodiment of FIGS. 1 to 4 hereof, an opening 12 is provided in leg member 10. A hollow sleeve member 14 is provided closely slidably fitting within leg member 10. An opening 16 is provided in sleeve member 14, which opening 16 is of size and shape identical with opening 12 in leg member 10. A second opening 18 is formed in sleeve member 14 diametrically opposed to sleeve opening 16, which opening 18 may be of the same size and shape as sleeve opening 16, but which may be smaller in size and of different outline than sleeve opening 16. That portion of sleeve 14 which margins opening 18 is shouldered inwardly, as indicated at 20, for reasons to be developed below. Member 10 may constitute the ground or other support-engaging leg of a chair, or chaise, or the like. The open lower end of such leg is ordinarily closed by a removable skid member or wheeled element (not shown), the removability being dictated by the fact that access must be had to the interior of the leg at the point where it is engaged by a cross, or bracing member. In every embodiment of the present invention, the cross or bracing member is indicated by reference numeral 30. Cross-brace 30 is also of hollow tubular material, and is of such outer dimensional size and shape as to slide closely and snugly into and past openings 12 and 16 in the leg 10 and sleeve 14 members. The free end of cross-brace 30, which need not necessarily be of such outer dimensional size and shape of the second sleeve opening 18 but which must be of such size and shape as to extend through said opening 18 and rest snugly within and upon shoulder 20. A spring-32-loaded release button 34 is provided adjacent the end of cross-brace 30, so positioned as to lock cross-brace 30 releasably to leg 10 and sleeve 14 when the head 34 of the button passes through the aligned openings 12, 16. As will be readily understood, button 34 must be depressed to or below the level of the cross-brace in order to pass through the aligned openings 12, 16, the biasing of spring 32 urging button 34 upwardly and out of the cross-brace when button 34 passes the double walls of the leg and sleeve members. As can be appreciated from FIG. 2, cross-brace 30 is free to slide transversely with respect to leg member 10 until the free end 31 of cross-brace 30 bears against the inner aspect of leg 10. However, and preferably, button 34 is so positioned in cross-brace 30 with respect to the free end 31 thereof and the distance between the inner aspect of leg 10, as at 11, and the inner aspect of sleeve 14, as at 15, that little movement can take place between the leg 10 and the cross-brace 30 when they are engaged, as seen in FIGS. 1 and 2.

When it is desired to remove cross-brace 30 or otherwise to disassemble the members, button 34 within the hollow leg 10 and sleeve 14 combination, is depressed by a suitable tool below the level of the outer margins of cross-brace 30, thereupon permitting cross-brace 30 to be disengaged from and withdrawn from leg member 10. While engaged, cross member 30 is supported by and upon the shoulder 20 at its free end, and by and upon the paired walls of sleeve member 14 and leg member 10 at openings 12, 16, thus eliminating or reducing play or relative transverse movement between the leg and cross-brace, to provide the desirable rigidity in the construction. Sleeve 14 need not, and preferably is not, coextensive in length with leg support 10. It need be only of length slightly longer than the outer thickness of the cross-bracing element.

In the embodiment of FIG. 5, wherein like parts are given like numerical identifications, access is provided to the release button 34a by a finger-trigger 36 projecting upwardly from cross-brace 30 through an elongated slot 38 in the wall of the cross-brace. In the embodiment of FIGS. 1 to 4, the spring 32 loaded button 34 comprises a base portion 32 secured to and extending along the lower inner wall of cross-brace 30, an upwardly bent intermediate portion 33a, and a straight elongated reversely extending arm 35a, to the free end of which button 34 is secured. In the embodiment of FIG. 5, there is provided a base portion 33a, an upwardly bent intermediate portion 35a, and an elongated reversely extending arm 37a, an intermediate portion 36 thereof is deformed upwardly to extend through slot 38 whereby button 34a can be manipulated to engage and disengage a cross-brace 30 from a leg member 10. Of course, as will be readily understood, the embodiment of FIG. 5, while it eliminates the necessity for clearing the end of a leg as 10 to provide access to the button 34 in the embodiment of FIGS. 1 to 4, has the relative unattractiveness of the visible finger trigger 36 and slot 38.

A third embodiment of the present invention shown in FIGS. 6 to 9 provides diametrically opposing short registering slots 50, 52 in leg member 10b and sleeve member 14b respectively communicating with the registering openings as 12, 16 in the leg and sleeve. Crossbrace 30b is provided with a pin 60 extending diametrically through and beyond the cross-brace, the length of pin 60 being somewhat less than the distance between the ends of the aligned slots 50, 52 thereby to permit pin 60 extending from cross-brace 30b to pass through the aligned slots 50, 52. On passage of the pinned end of cross-brace 30b through the slots 50, 52, the cross-brace is turned 90°, in either direction, to bring the ends 61, 61 of pin 60 into contact with the inner aspect of sleeve member 14b. On reverse turning of cross-brace 30b, pin ends 61, 61 can be brought into alignment with slots 50, 52, permitting disengagement and withdrawal of the cross-brace from the leg assembly.

It will be understood that while all the embodiments of the present invention are described and illustrated as applicable to hollow circular tubular members, they need not be so limited and may be applied to tubular members, hollow or solid, of other geometric shapes. The invention may be applied to a chair, chaise or the like article of furniture, and to all other articles or devices in which a removable bracing element is desirable or necessary. In the claims appended hereto, the phrase "chair, chaise, or the like" is not to be limited to articles of furniture but is to read as applicable to any article or device which includes removable bracing of the type and kind hereinabove described.

I claim:

1. A hollow tubular first member having only one opening in a side wall thereof, a second hollow concentric tubular member removably positioned within the first member, having a first opening in a wall thereof coincident in size and shape with the opening in the side wall of the first member, a second opening in a wall of the concentric second member opposed to the first opening in the second member, and a cross-bracing member removably connected to the first member, the outer dimensions and shape of the end of which cross-bracing member register with the coinciding openings in the first and second members and pass through said openings, with the free end portion of the cross-brace received within the second opening in the second member along a chordal plane segmenting the side wall of the second member, and means on the second member supporting the end portion of the cross brace along said chordal plane.

2. An article as in claim 1, including means releasably to lock the cross-brace within and to the first member.

3. An article as in claim 2, wherein the locking means comprise a pin extending dismetrically from the end of the cross-bracing member, and the aligned openings in the first and second members, and include diametrically opposed slots permitting passage of the lock pin therethrough.

4. An article as in claim 2 wherein the second opening in the second member is of the same size and shape as the aligned openings in the first and second members.

5. An article as in claim 2, wherein the area of the second member margining the second opening therethrough is shouldered inwardly thereby to provide a support for the free end of the cross-brace.

6. An article as in claim 2, wherein the lock means comprise a spring-loaded button having a locking head mounted within the second member.

7. An article as in claim 6, in which the operating head is manipulable only from within the second member.

8. An article as in claim 6, in which the operating head is manipulable selectively from within the second member or from a point spaced therefrom.

* * * * *